(12) United States Patent
Yoon et al.

(10) Patent No.: US 9,212,716 B2
(45) Date of Patent: Dec. 15, 2015

(54) ACTIVE ROLL-ROD FOR VEHICLE

(71) Applicant: Hyundai Motor Company, Seoul (KR)

(72) Inventors: Hyoung-Jin Yoon, Suwon-shi (KR); Sang-Il Lee, Anyang-shi (KR); Dong-Wook Lee, Yongin-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/550,438

(22) Filed: Nov. 21, 2014

(65) Prior Publication Data

US 2015/0204406 A1 Jul. 23, 2015

(30) Foreign Application Priority Data

Jan. 23, 2014 (KR) .................. 10-2014-0008150

(51) Int. Cl.
*F16F 6/00* (2006.01)
*F16F 15/03* (2006.01)
*B60K 5/12* (2006.01)

(52) U.S. Cl.
CPC ............... *F16F 6/005* (2013.01); *B60K 5/1216* (2013.01)

(58) Field of Classification Search
CPC ......... F16F 6/005; F16F 15/022; F16F 15/03; F16F 15/04; F16F 15/08; B60K 5/1216; B60K 5/1208; B60K 5/1241; B60K 5/1266; B60K 5/1275; B60K 5/1283
See application file for complete search history.

(56) References Cited

U.S. PATENT DOCUMENTS

| | | | | |
|---|---|---|---|---|
| 5,740,876 A | * | 4/1998 | Shimose et al. | 180/232 |
| 6,186,485 B1 | * | 2/2001 | Kawazoe | 267/140.14 |
| 6,189,873 B1 | * | 2/2001 | Aoki | 267/140.14 |
| 8,763,996 B2 | * | 7/2014 | Ishiguro et al. | 267/140.14 |
| 8,794,605 B2 | * | 8/2014 | Mizobe | 267/140.12 |
| 9,033,321 B2 | * | 5/2015 | Lee et al. | 267/141.1 |
| 2005/0254888 A1 | * | 11/2005 | Oji | 403/187 |
| 2013/0328254 A1 | * | 12/2013 | Kojima et al. | 267/140.15 |
| 2014/0110558 A1 | * | 4/2014 | Kim | 248/638 |
| 2015/0001773 A1 | * | 1/2015 | Inoue | 267/140.15 |
| 2015/0008305 A1 | * | 1/2015 | Loeffelsender et al. | 248/638 |
| 2015/0034797 A1 | * | 2/2015 | Lee et al. | 248/562 |
| 2015/0204405 A1 | * | 7/2015 | Shimada | 267/141.2 |

FOREIGN PATENT DOCUMENTS

| | | |
|---|---|---|
| JP | 05-180263 A | 7/1993 |
| JP | 06-042576 A | 2/1994 |
| KR | 10-2005-0034285 A | 4/2005 |
| KR | 10-2011-0045998 A | 5/2011 |
| WO | WO 2012/026111 A1 | 3/2012 |

* cited by examiner

*Primary Examiner* — Laura Freedman
(74) *Attorney, Agent, or Firm* — Morgan, Lewis & Bockius LLP (57) ABSTRACT

An active roll rod for a vehicle may include a rod portion, a fastening unit, insulators, an end plate and a damper unit. The rod portion may have a main body portion with a front end connected to a power train, and an inner pipe formed at a rear side of the main body portion. The fastening unit may be mounted to a sub-frame, slidably coupled to the inner pipe and have a partition wall portion formed on an inner circumferential surface. The insulators may be mounted at front and rear sides of the partition wall portion and made of an elastic material. The end plate may be coupled to a rear end of the inner pipe. The damper unit may have a cooperating unit on which a permanent magnet is mounted, and a coil portion which generates electromagnetic force and controls an operation of the cooperating unit. The damper unit may be embedded in the fastening unit.

6 Claims, 7 Drawing Sheets

ACTIVE ROLL-ROD FOR VEHICLE

CROSS-REFERENCE TO RELATED APPLICATIONS

The present application claims priority of Korean Patent Application Number 10-2014-8150 filed on Jan. 23, 2014, the entire contents of which application are incorporated herein for all purposes by this reference.

BACKGROUND OF INVENTION

1. Field of Invention

The present invention relates to an active roll rod for a vehicle, and more particularly, to an active roll rod for a vehicle which has been invented to more efficiently suppress vibration, which is transmitted to a vehicle body, depending on a driving state of a vehicle by embedding a damper unit (which is configured to be able to absorb vibration within an overall frequency region by adjusting a frequency of a current), which serves as an active damper, in a fastening unit that is mounted to a sub-frame.

2. Description of Related Art

In passenger vehicles, a monocoque body, which is light in weight and has excellent productivity, is mainly used instead of a frame body. The monocoque body is a structure in which a separate frame is eliminated, and a power train, which is configured by coupling an engine and a transmission, is directly mounted in an engine room of a vehicle body. Therefore, in the case of the monocoque body, the vehicle body itself serves as a frame, and a suspension system and chassis components are mounted thereto, respectively, but a sub-frame is mounted below the vehicle in order to prevent vibration of the power train from being directly transmitted to the vehicle body, and disperse impact at the time of a vehicle collision.

Meanwhile, a four-point mounting manner and a three-point mounting manner are widely adopted depending on a size and disposition of the power train. As a sub-frame that is used in the three-point mounting manner among various mounting manners, an "I" shaped (or an "H" shaped) sub-frame, which is called a dog bone type (the dog bone type is called a roll rod type), is used, a suspension device, a steering device, and the like are coupled to the sub-frame, and the sub-frame is connected to a lower portion of the power train through a roll rod.

Figure 1A:
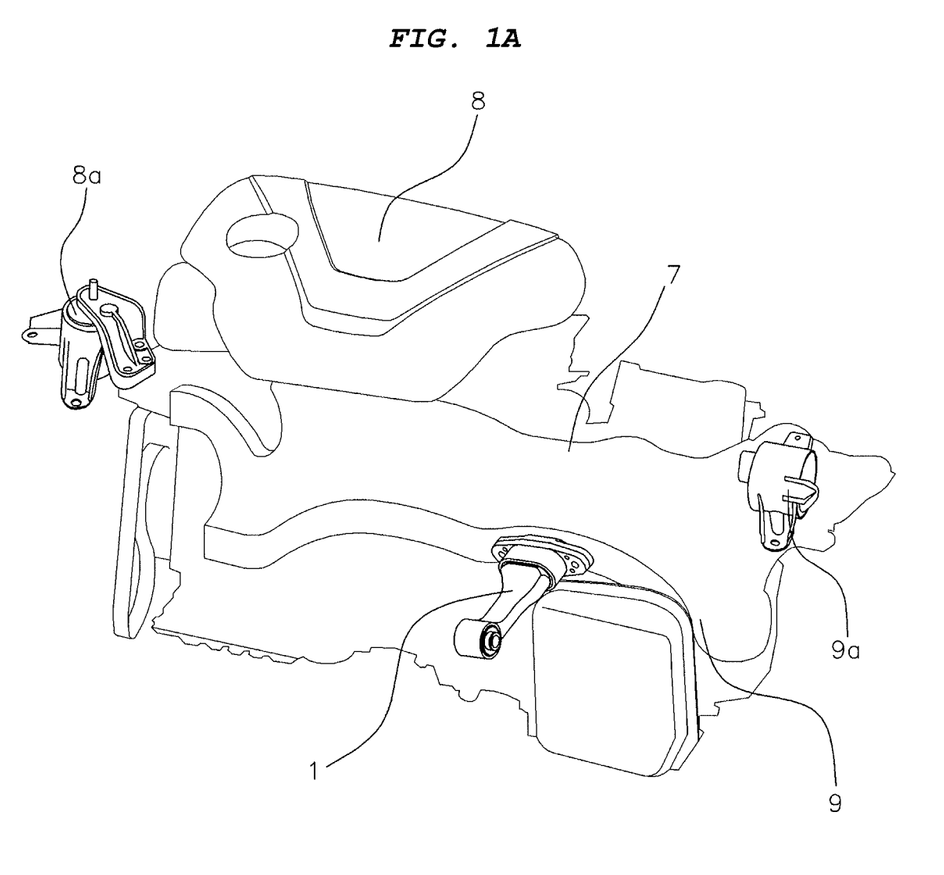
FIG. 1A is a view illustrating an appearance in which an engine mount and a transmission mount are coupled to both sides of a power train that is configured by coupling an engine and a transmission, respectively, and a sub-frame is disposed below the power train and coupled to the power train through a roll rod.
Figure 1B:
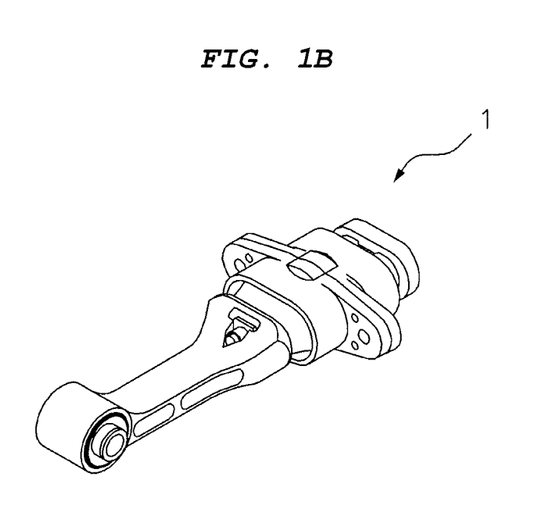
FIG. 1B is an enlarged view of the roll rod in FIG. 1A.

That is, as illustrated in FIGS. 1A and 1B, an engine mount 8a and a transmission mount 9a are mounted at both sides of the engine room of the vehicle body, respectively, so as to support loads of an engine 8 and a transmission 9, respectively, and a roll rod 1 is mounted to a sub-frame 7 that is attached to a lower portion, and connected to the transmission 9 so as to control displacement of a power train and attenuate vibration.

Figure 1C:
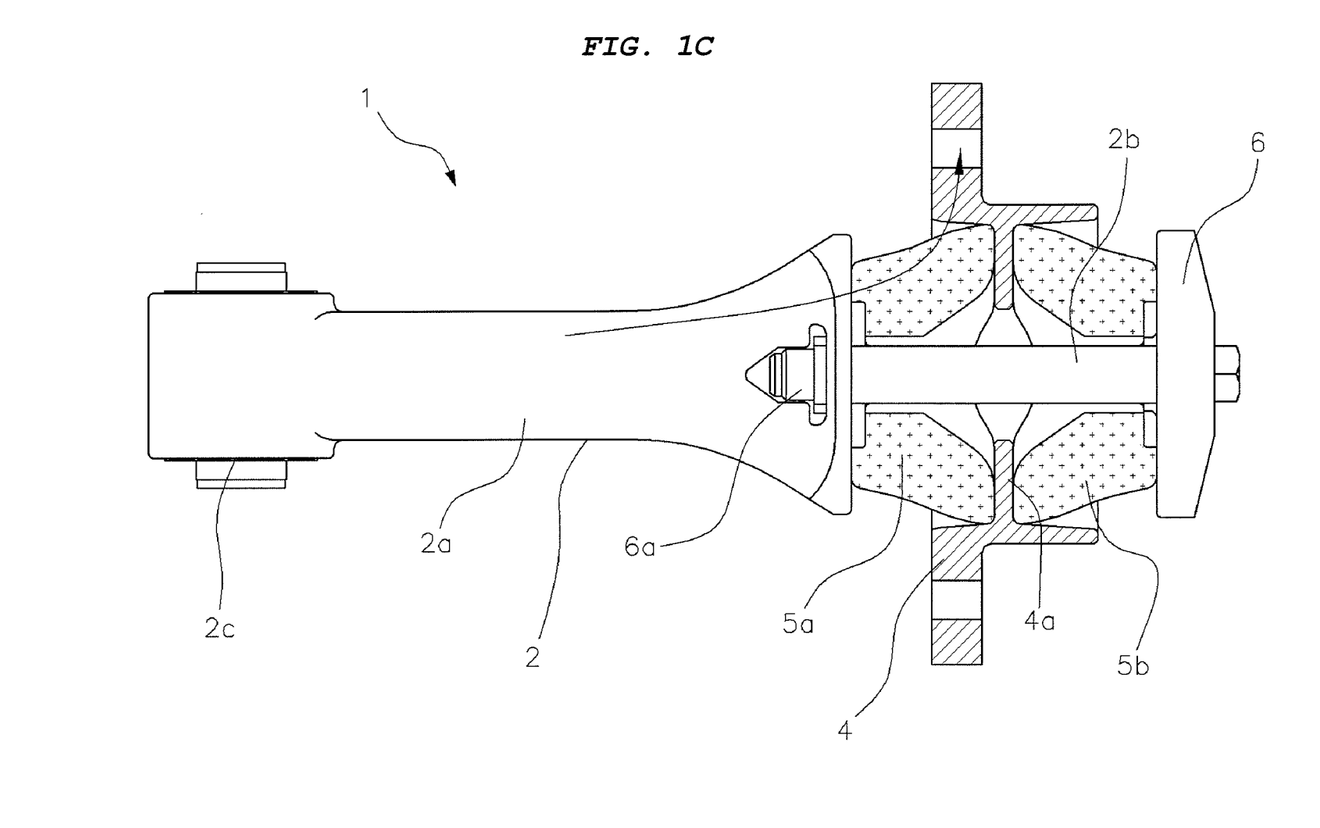
FIG. 1C is a view illustrating an appearance in which a fastening unit is partially cut out to show a roll rod in a coupled state in the related art.

Referring to FIG. 1C, in the case of the roll rod 1 in the related art, a fastening unit 4 is mounted between a rod portion 2 and an end plate 6, and insulators 5a and 5b made of synthetic rubber are fitted at a front side (at a left side in FIG. 1C) and a rear side of the fastening unit 4, respectively, so as to support an operation of the roll rod 1 and attenuate vibration.

The rod portion 2 includes a main body portion 2a which is connected to the power train (more particularly, a bracket formed on a lower portion of the transmission) through a bushing 2c mounted to a front end of the rod portion 2, and an inner pipe 2b which is extended from the main body portion 2a. Further, the front insulator 5a, the fastening unit 4, the rear insulator 5b, and the end plate 6 are sequentially disposed and mounted on the inner pipe 2b, and the end plate 6 is fastened to the inner pipe 2b by a fixing bolt 6a. A partition wall portion 4a is formed on an inner circumferential surface of the fastening unit 4 so as to partition the front insulator 5a and the rear insulator 5b, and a flange is formed on an outer circumferential surface of the fastening unit 4, and fastened to the sub-frame by bolting.

In the case of the roll rod 1 having the aforementioned structure, as the rod portion 2 and the end plate 6 are operated together depending on a driving state of a vehicle, the front and rear insulators 5a and 5b are elastically deformed and restored repeatedly to support loads and attenuate vibration. That is, when the vehicle is moved forward, the rear insulator 5b is compressed depending on the displacement of the power train due to inertia so as to support an operation of the power train and perform a damping function, and when the vehicle is moved rearward or decelerated, the front insulator 5a is compressed so as to support an operation of the power train and perform a damping function.

Meanwhile, the recent trend is that an improvement on NVH (noise, vibration, and harshness) performance is required for developing a vehicle, and a cylinder deactivation (CDA) engine (variable cylinder engine) is applied. Accordingly, in order to improve efficiency in attenuating vibration in accordance with a driving state of a vehicle, needs for an active mount having a function of absorbing vibration are increased.

Nom Amongst others, in the case of a front-engine-front-drive (FF) vehicle having the three-point mounting manner, characteristics of vibration, which is transmitted from the power train to the vehicle body, may be determined depending on characteristics of the roll rod. More particularly, in the case of the engine mount 8a or the transmission mount 9a that is configured in a block shape and seated on the vehicle body, the active damper is embedded therein or a separate damper is additionally mounted in the vicinity thereof such that vibration generated in the engine may be more efficiently attenuated, but in the case of the roll rod, the steering device, the suspension device, and the like are seated on the sub-frame, which causes a space to become small, and as a result, there is a problem in that it is difficult to additionally mount the damper. In addition, there occurs a difference in displacement between the roll rod and the vehicle body by an operation of the power train due to the generation of vibration of a vehicle even though a space for additionally mounting the damper in the vicinity of the roll rod is provided in the sub-frame, and as a result, there is a problem in that interference due to the aforementioned configuration needs to be avoided.

In the case of the roll rod, it is very difficult to configure a hydraulic structure in which a hydraulic fluid is sealed as a working fluid, and as a result, there is a problem in that a size of the roll rod is increased when the damper is added because the size of the roll rod becomes very large even if the hydraulic structure is applied.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an active roll rod for a vehicle in which a damper unit, which serves as an active damper, is embedded.

Various aspects of the present invention provide a roll rod for a vehicle, which is mounted to connect a sub-frame and a power train, the roll rod including: a rod portion which has a main body portion having a front end that is connected to a power train, and an inner pipe that is formed at a rear side of the main body portion and has a smaller diameter than the main body portion; a fastening unit which is mounted to a sub-frame, is slidably fitted with and coupled to the inner pipe, and has a partition wall portion formed on an inner circumferential surface thereof; insulators which are mounted at front and rear sides of the partition wall portion, respectively, and made of an elastic material; an end plate which is coupled to a rear end of the inner pipe so as to prevent a rear insulator from being moved away; and a damper unit which has a cooperating unit on which a permanent magnet is mounted, and a coil portion which generates electromagnetic force by electric power applied from an outside and controls an operation of the cooperating unit, in which the damper unit is mounted to be embedded in the fastening unit.

The inner pipe may penetrate the damper unit and the cooperating unit may be spaced apart from a position where the inner pipe penetrates to form an insertion groove, and the coil portion may be movably mounted into the insertion groove.

The cooperating unit may have a first bobbin and a second bobbin that are stacked on both side surfaces of the permanent magnet, the inner pipe may be configured to penetrate the permanent magnet, the first bobbin, and the second bobbin, the first bobbin may have an enlarged portion that is bent and extended from an edge to surround outer sides of the permanent magnet and the second bobbin, and the enlarged portion may be spaced apart from the permanent magnet and the second bobbin to provide a space therebetween which severs as the insertion groove.

In an aspect of the present invention, a seating groove may be formed in an inner circumferential surface of the partition wall portion along a circumference of the partition wall portion, and the damper unit may be mounted so that the cooperating unit vibrates in the seating groove in a forward and rearward direction.

In the present invention, the damper unit, which cancels vibratory force of an engine, is embedded in the roll rod, and as a result, there are effects in that the roll rod may be mounted without changing a structure of the sub-frame, and vibration, which is transmitted to a vehicle body, may be more efficiently attenuated depending on a driving state of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A roll rod for a vehicle of the present invention is mounted to connect a power train, which is configured by coupling an engine and a transmission, with a sub-frame (to which a suspension device and a steering device are mounted, and which is coupled to a vehicle body). Hereinafter, the roll rod for a vehicle according to various embodiments of the present invention will be described in more detail with reference to the drawings.

A roll rod 100 of the present invention includes a rod portion 10, a fastening unit 40, insulators 30 (30a, 30b), and an end plate 20, and a damper unit 50 is embedded in the fastening unit 40 so that vibration, which is input to the rod portion 10, may be attenuated.

Figure 2:
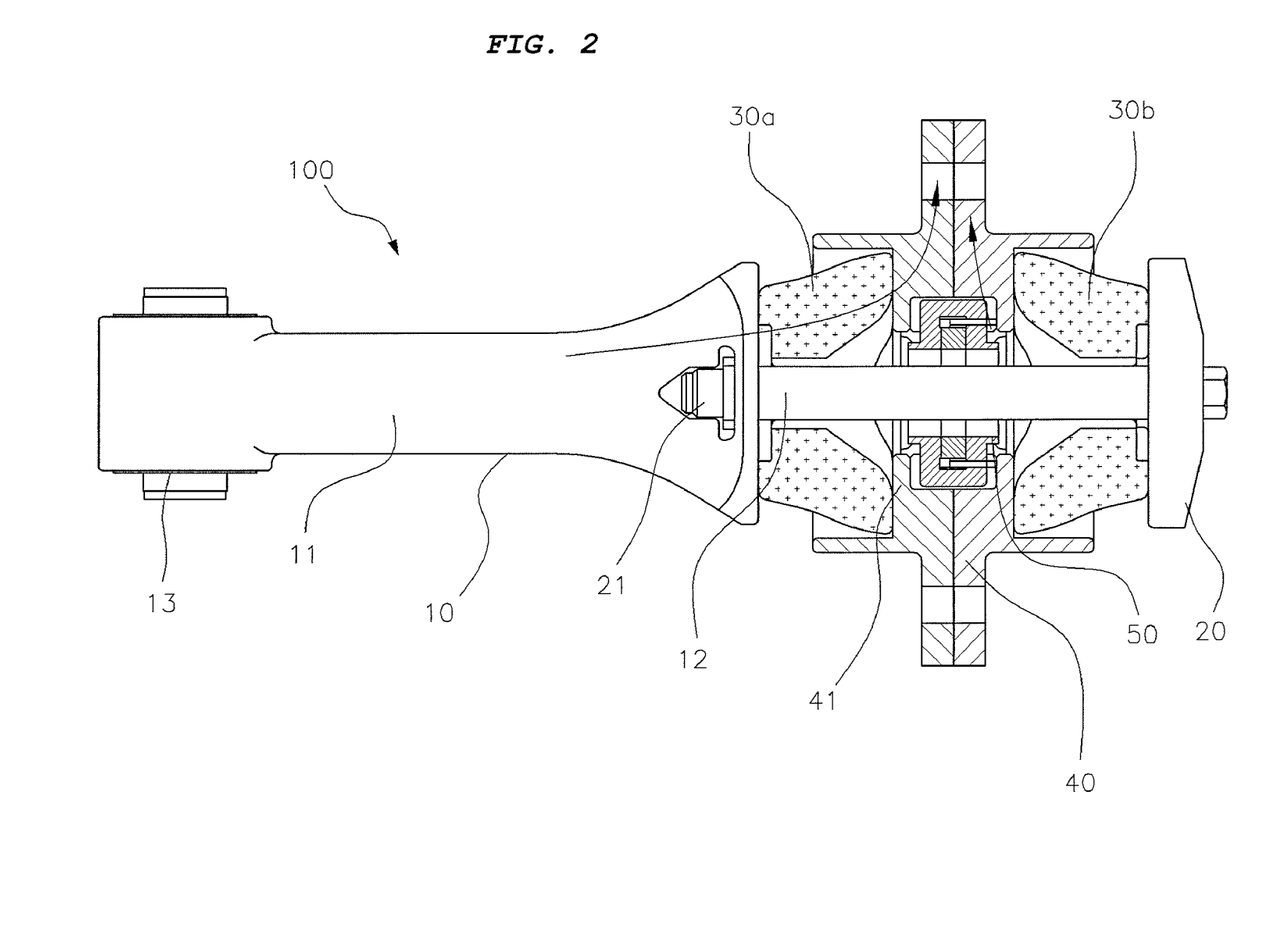
FIG. 2 is a view illustrating an appearance in which a fastening unit and a damper unit are partially cut out to show an exemplary roll rod in a coupled state according to the present invention.

That is, as illustrated in FIG. 2, the rod portion 10 has a main body portion 11 having a front end that is connected to a power train through a bushing 13, and an inner pipe 12, which has a smaller diameter than the main body portion, is formed at a rear side of the main body portion 11. The fastening unit 40 is slidably fitted with and coupled to the inner pipe 12, and the fastening unit 40 has a flange that is formed on an outer circumferential surface of the fastening unit 40 and bolted, fastened or mounted to a sub-frame, and a partition wall portion 41 that is formed on an inner circumferential surface of the fastening unit 40 so as to have a shape that protrudes toward the inner pipe.

The end plate 20 is mounted at a rear side of the inner pipe 12 (at a right side of FIG. 2) by a fixing bolt 21, and two insulators 30a and 30b are mounted between the end plate 20 and the main body portion 11. The insulators 30a and 30b include a front insulator 30a and a rear insulator 30b that are mounted with the partition wall portion 41 interposed therebetween, and are elastically deformed and restored repeatedly depending on an operation of the rod portion 10.

In the present invention, the damper unit 50 is embedded in the fastening unit 40, and the inner pipe 12 is mounted to penetrate a central portion of the damper unit 50. The damper unit 50 includes a cooperating unit on which a permanent magnet 51 is mounted, and a coil portion 54 which generates electromagnetic force by electric power applied from the outside and controls an operation of the cooperating unit.

Figure 3A:
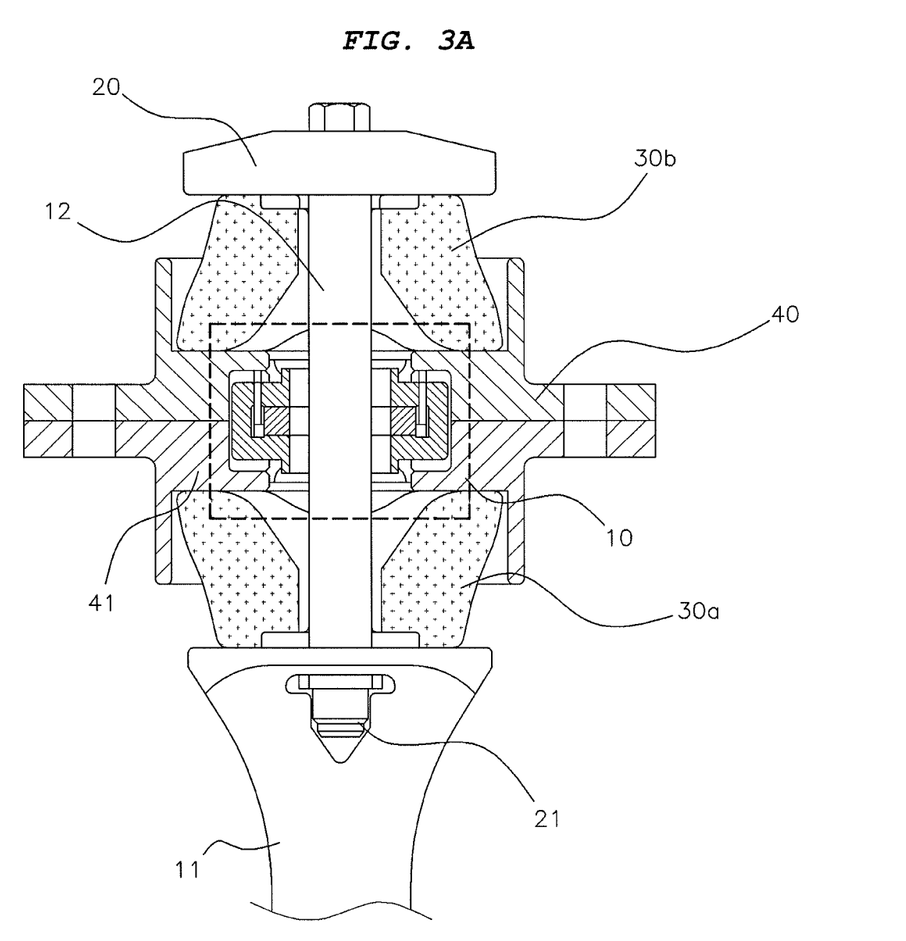
FIGS. 3A and 3B are partially enlarged views illustrating the damper unit mounted in the roll rod of FIG. 2.
Figure 3B:
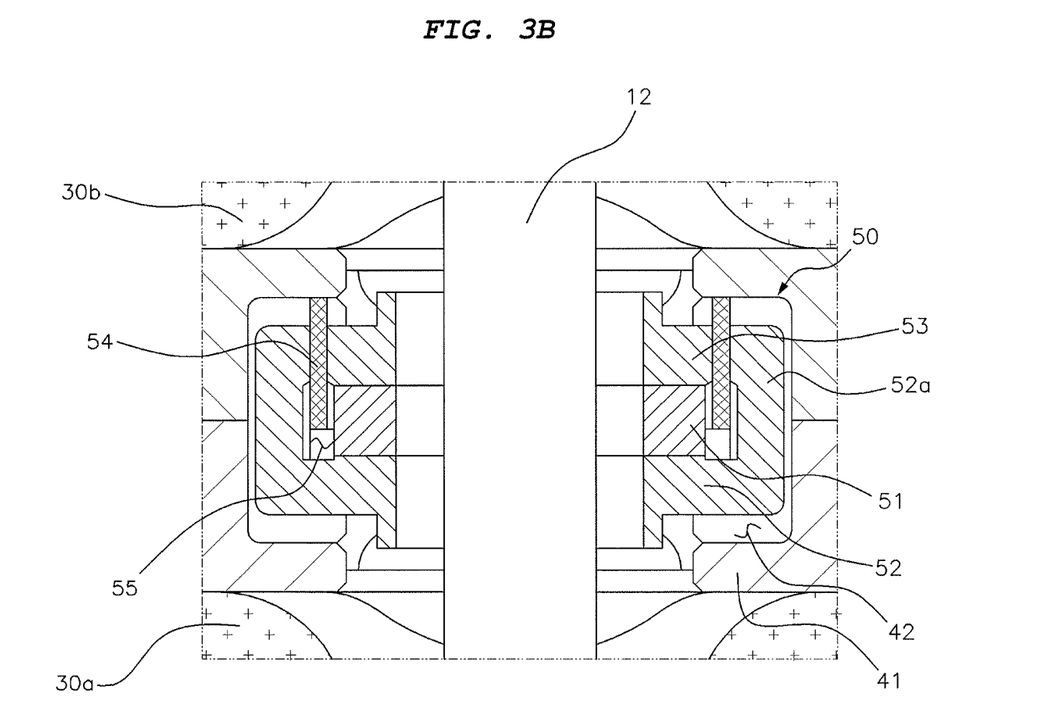

As more clearly illustrated in FIG. 3, the inner pipe 12 is mounted to penetrate a central portion of the cooperating unit, a circular insertion groove 55 is formed to be spaced apart at a predetermined distance from a position where the inner pipe 12 is coupled, and the coil portion 54 is mounted to be moved into the insertion groove 55.

In various embodiments of the present invention, the cooperating unit has a first bobbin 52 and a second bobbin 53 that are stacked on both side surfaces of the permanent magnet 51, and the inner pipe 12 is configured to penetrate the permanent magnet 51, the first bobbin 52, and the second bobbin 53.

The first bobbin 52 has an enlarged portion 52a that is extended while being bent from an edge thereof so as to surround outer sides of the permanent magnet 51 and the second bobbin 53, and the enlarged portion 52a is configured to be spaced apart from the permanent magnet 51 and the second bobbin 53 so as to form or provide the insertion groove in a space therebetween.

The present invention has a structure that may allow the cooperating unit to slide, but may restrict a range within which the cooperating unit slides. That is, a seating groove 42 is formed in an inner circumferential surface of the partition wall portion 41 along a circumference of the partition wall portion 41, the damper unit 50 is mounted in the seating groove 42, and the seating groove 42 has a size capable of allowing the cooperating unit to slide (vibrate) in a forward and rearward direction (in an upward and downward direction in FIG. 3).

Figure 4:
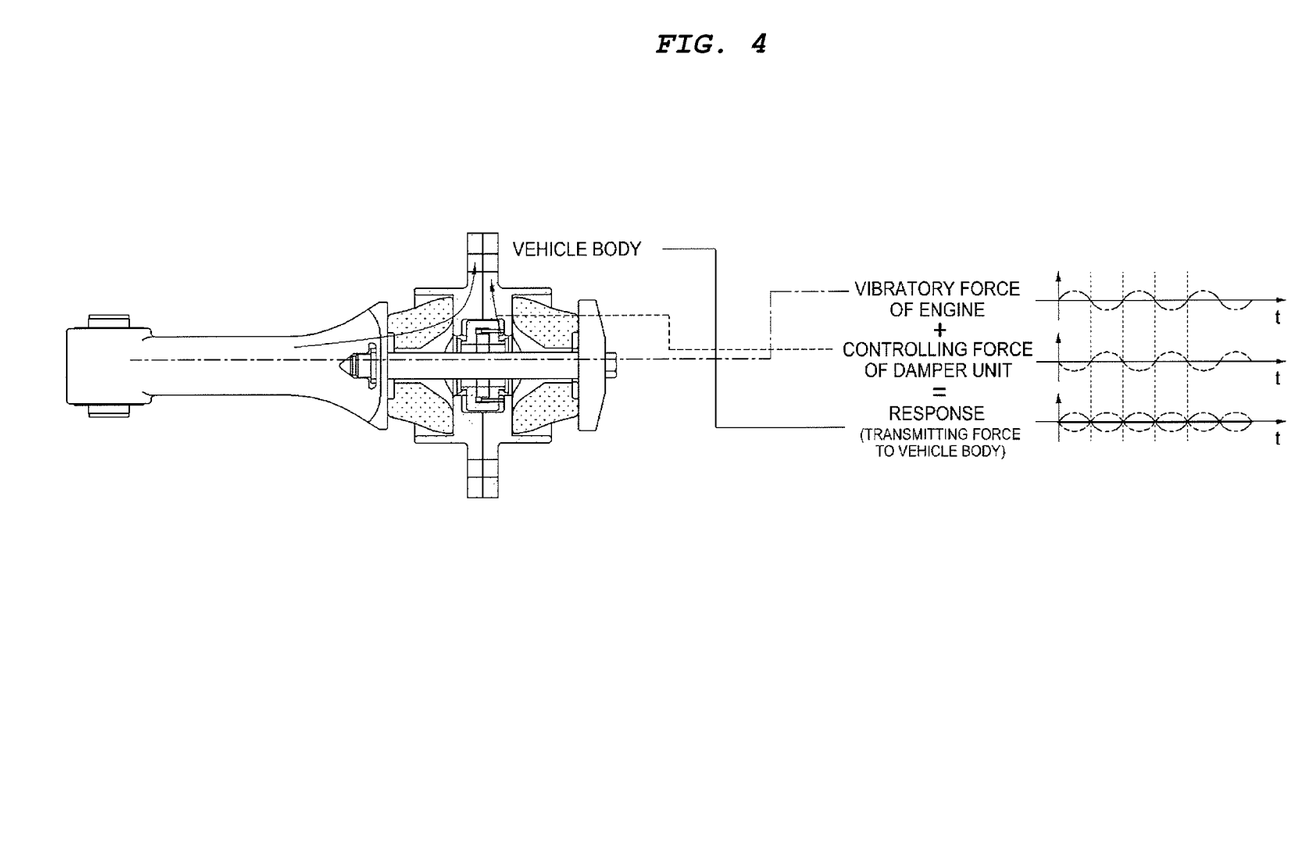
FIG. 4 is a view diagrammatically illustrating a state in which vibratory force (vibration) generated in an engine is cancelled by controlling force produced by the damper unit, and vibration, which is transmitted to a vehicle body, is attenuated, according to the present invention.

In the present invention having the aforementioned configurations or the like, as illustrated in FIG. 4, vibratory force of the engine which is input to the main body portion 11 is cancelled by controlling force produced by the damper unit 50, thereby removing oscillating components of transmitting force that is transmitted to the vehicle body (sub-frame). That is, as external electric power is applied, the damper unit 50 produces vibration having the opposite phase to the phase of vibration applied to the roll rod from the engine, thereby suppressing vibration that is transmitted to the vehicle body.

In various embodiments of the present invention, when characteristics of vibration applied to the roll rod are sensed by a sensor, a control device, which applies electric power to the damper unit 50, controls voltage values, current values and the like of the applied electric power so as to produce vibration having the opposite phase to the phase of input vibration, and as the sensor and the control device, publicly known devices or technologies, which control an active damper for a vehicle, may be used.

For convenience in explanation and accurate definition in the appended claims, the terms "inner" or "outer", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active roll rod for a vehicle, comprising:
   a rod portion which has a main body portion having a front end that is connected to a power train, and an inner pipe that is formed at a rear side of the main body portion and has a smaller diameter than the main body portion;
   a fastening unit which is mounted to a sub-frame, is slidably fitted with and coupled to the inner pipe, and has a partition wall portion formed on an inner circumferential surface thereof;
   insulators which are mounted at front and rear sides of the partition wall portion, respectively, and made of an elastic material;
   an end plate which is coupled to a rear end of the inner pipe so as to prevent a rear insulator from being moved away; and
   a damper unit which has a cooperating unit on which a permanent magnet is mounted, and a coil portion which generates electromagnetic force by electric power applied from an outside and controls an operation of the cooperating unit,
   wherein the damper unit is mounted to be embedded in the fastening unit.

2. The active roll rod of claim 1, wherein the inner pipe penetrates the damper unit and the cooperating unit is spaced apart from a position where the inner pipe penetrates to form an insertion groove, and the coil portion is movably mounted into the insertion groove.

3. The active roll rod of claim 2, wherein:
   the cooperating unit has a first bobbin and a second bobbin that are stacked on both side surfaces of the permanent magnet;
   the inner pipe is configured to penetrate the permanent magnet, the first bobbin, and the second bobbin;
   the first bobbin has an enlarged portion that is bent and extended from an edge to surround outer sides of the permanent magnet and the second bobbin; and
   the enlarged portion is spaced apart from the permanent magnet and the second bobbin to provide a space therebetween which serves as the insertion groove.

4. The active roll rod of any one of claim 3, wherein a seating groove is formed in an inner circumferential surface of the partition wall portion along a circumference of the partition wall portion, and the damper unit is mounted so that the cooperating unit vibrates in the seating groove in a forward and rearward direction.

5. The active roll rod of any one of claim 2, wherein a seating groove is formed in an inner circumferential surface of the partition wall portion along a circumference of the partition wall portion, and the damper unit is mounted so that the cooperating unit vibrates in the seating groove in a forward and rearward direction.

6. The active roll rod of any one of claim 1, wherein a seating groove is formed in an inner circumferential surface of the partition wall portion along a circumference of the partition wall portion, and the damper unit is mounted so that the cooperating unit vibrates in the seating groove in a forward and rearward direction.

* * * * *